United States Patent
McCarthy

(10) Patent No.: US 6,513,801 B1
(45) Date of Patent: Feb. 4, 2003

(54) HINGED/SPLIT REINFORCED CLAM SHELL BUSHING

(75) Inventor: Frank J. McCarthy, Milan, OH (US)

(73) Assignee: The Pullman Company, Milan, OH (US)

( * ) Notice: Subject to any disclaimer, the term of this patent is extended or adjusted under 35 U.S.C. 154(b) by 0 days.

(21) Appl. No.: 10/202,287

(22) Filed: Jul. 24, 2002

(51) Int. Cl.⁷ .......................... B60G 11/24; F16C 33/08
(52) U.S. Cl. .................. 267/293; 267/189; 267/141.1; 280/124.13; 280/124.177; 384/273
(58) Field of Search .................. 267/189, 276, 267/293, 294, 141.1, 141.2; 280/124.107, 124.13, 124.177; 384/272, 273, 276

(56) References Cited

U.S. PATENT DOCUMENTS

| | | | |
|---|---|---|---|
| 3,861,764 A | | 1/1975 | Adams |
| 4,370,005 A | * | 1/1983 | Sarai et al. .................. 384/154 |
| 4,655,614 A | | 4/1987 | Scott |
| 4,707,149 A | | 11/1987 | Hahle |
| 4,895,353 A | | 1/1990 | Roth et al. |
| 4,916,749 A | | 4/1990 | Urban et al. |
| 5,040,774 A | | 8/1991 | Veverka et al. |
| 5,056,763 A | | 10/1991 | Hamada et al. |
| 5,169,244 A | * | 12/1992 | Siebert et al. .............. 384/276 |
| 5,413,374 A | * | 5/1995 | Pierce ......................... 280/713 |
| 5,437,439 A | * | 8/1995 | Brokamp et al. ........... 267/293 |
| 5,520,465 A | | 5/1996 | Kammel |
| 5,601,372 A | | 2/1997 | Erikson et al. |
| 5,829,769 A | * | 11/1998 | Hillqvist .............. 280/124.107 |
| 5,865,429 A | | 2/1999 | Gautheron |
| 5,915,842 A | | 6/1999 | Redinger |
| 6,155,541 A | | 12/2000 | Farris et al. |
| 6,170,812 B1 | | 1/2001 | Nicoles |

\* cited by examiner

Primary Examiner—Christopher P. Schwartz
(74) Attorney, Agent, or Firm—Harness, Dickey & Pierce, PLC

(57) ABSTRACT

A stabilizer bar assembly includes a stabilizer bar and a pair of bushing assemblies. Each bushing assembly includes a first semi-circular member, a second semi-circular member and a hinge connecting the two semi-circular members together. The two semi-circular members encases the stabilizer bar and the two semi-circular members are encased by a frame bracket which attaches the stabilizer bar to a vehicle. Each semi-circular member includes an embedded rigid semi-circular member to control the compression and flexing of the bushing assembly.

15 Claims, 2 Drawing Sheets

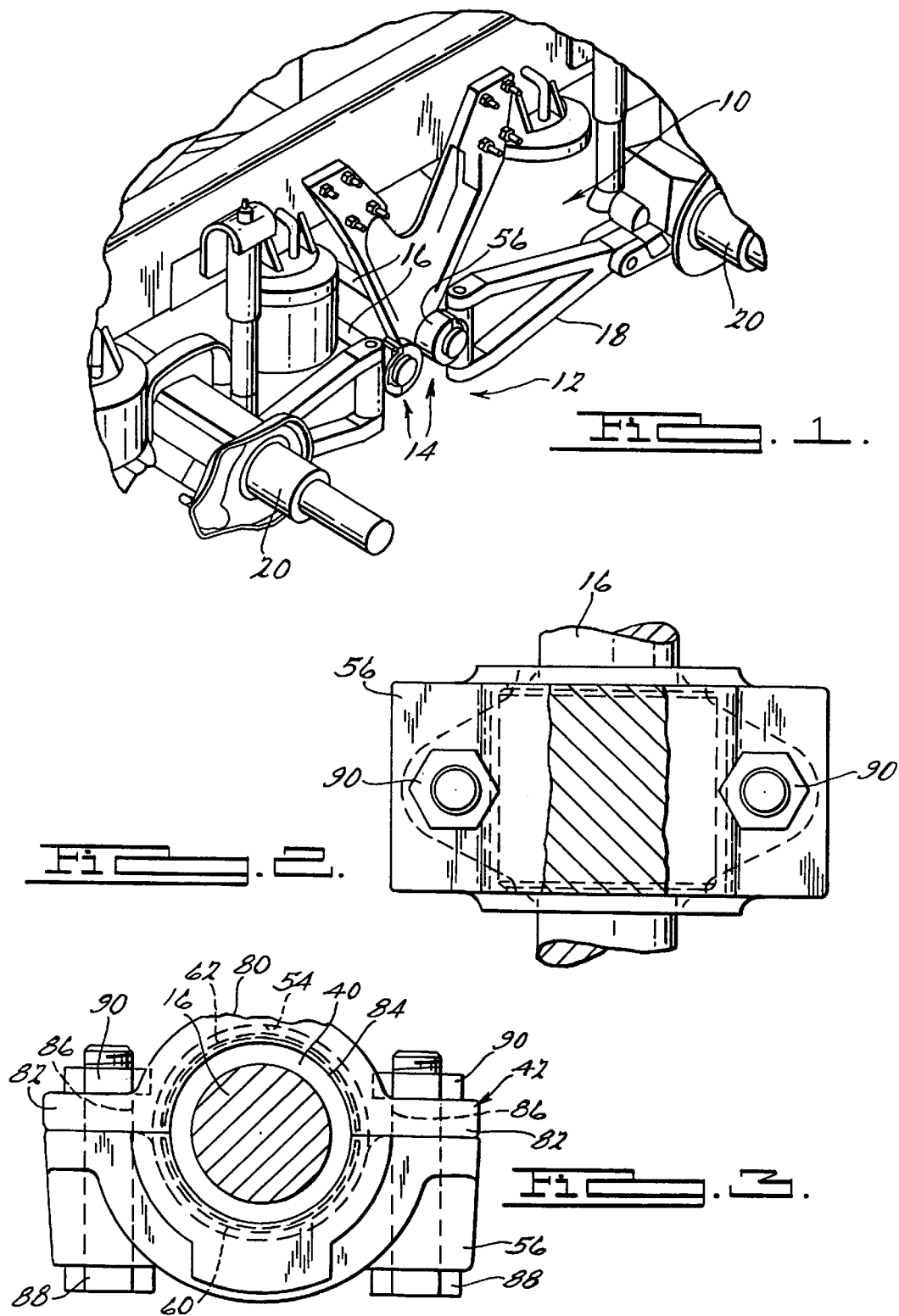

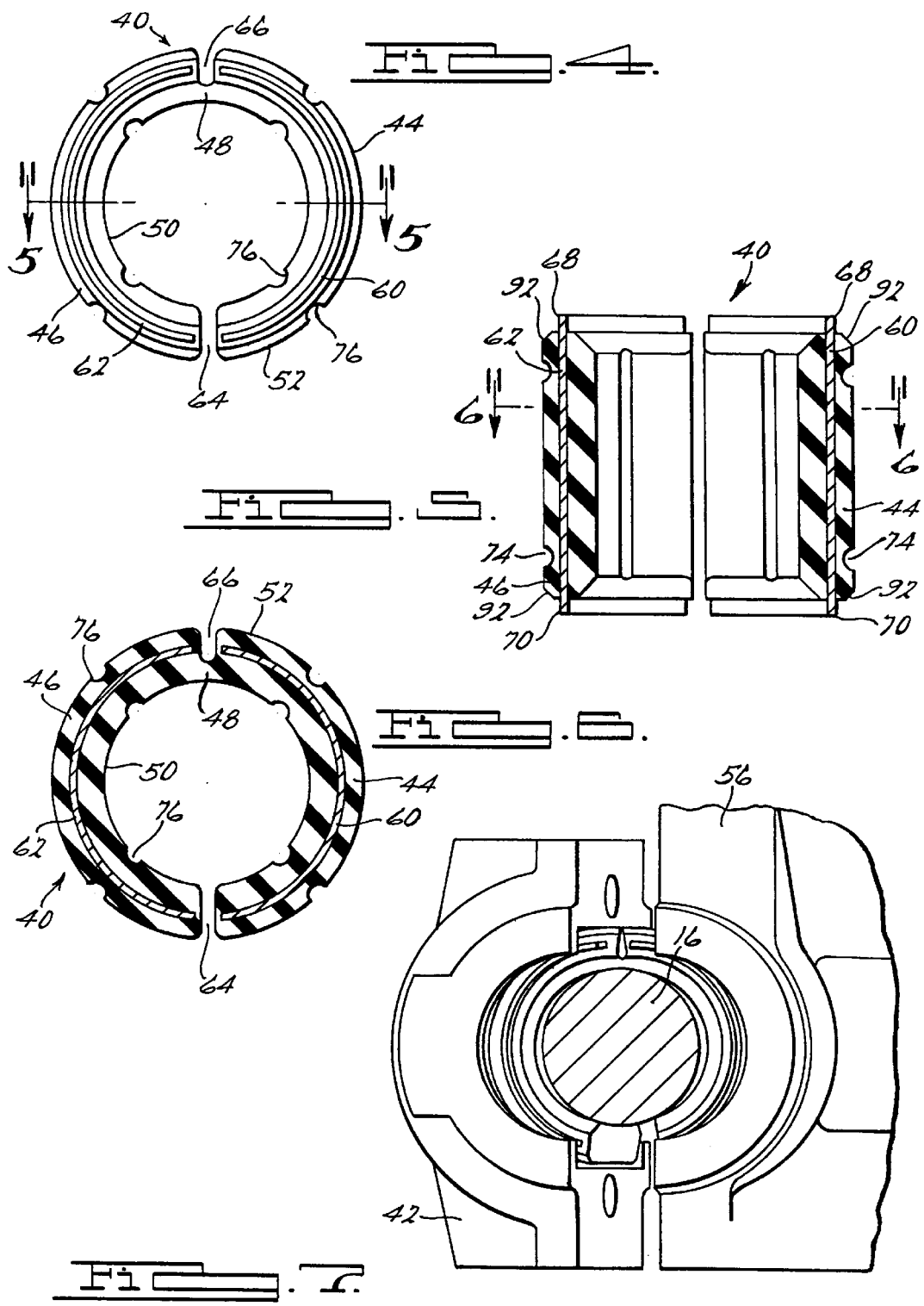

HINGED/SPLIT REINFORCED CLAM SHELL BUSHING

FIELD OF THE INVENTION

The present invention relates to stabilizer bar bushings. More particularly, the present invention relates to a stabilizer bar bushing which comprises two semi-circular rate plates which are imbedded within a rubber half cylinder. The two half cylinder rubber pieces are hinged together on one side to provide the hinged/split reinforced clam shell bushing of the present invention.

BACKGROUND OF THE INVENTION

Conventional motor vehicle suspension systems often include one or more stabilizer bars to control the degree of roll of the motor vehicle during cornering or during other vehicle maneuvers. A typical stabilizer bar is generally U-shaped having a long intermediate portion disposed laterally with respect to the motor vehicle and a pair of relatively short end portions extending forwardly or rearwardly to attach to a corresponding pair of suspension arms or wheel hubs. The intermediate portion normally is attached to the underside of the vehicle by one or more bracket assemblies.

The mounting bracket assembly for the intermediate portion of the stabilizer bar typically includes an elastomeric bushing, sometimes termed an insulator, a bracket or housing which is secured to the underside of the vehicle and a bracket which engages the elastomeric bushing and which is secured to the bracket or housing secured to the underside of the vehicle. The elastomeric bushing is thus located between the stabilizer bar and the brackets to support and isolate the stabilizer bar.

The typical installation procedure for the attachment of the stabilizer bar to the underside of the vehicle involves first positioning a pair of cylindrical elastomeric bushings over the stabilizer bar and then sliding the bushings along the stabilizer bar until they reach their design position. The stabilizer bar is then positioned on the vehicle by engaging the elastomeric bushings with the bracket or housing which is secured to the underside of the vehicle. Then a flanged semi-circular bracket is placed over each of the elastomeric bushings and these brackets are bolted to the bracket or housing secured to the underside of the vehicle. The bolting of the bracket to the bracket or housing secured to the vehicle positions the elastomeric bushing within the semi-circular bracket and thus secures the intermediate portion of the stabilizer bar to the vehicle. The elastomeric bushing is designed to be compressed by the bolting of the bracket to the bracket or housing secured to the vehicle and this compression of the elastomeric bushing eliminates slippage of the stabilizer bar with respect to the bushing during movement of the vehicle's suspension. Movement of the stabilizer bar with respect to the bracket assembly is accomplished by the flexing of the elastomeric bushing.

Stabilizer bars can be single piece components or they can be multiple piece components where the intermediate portion and the end portions are all separate components. Regardless of the design, the intermediate portion is secured to the vehicle and the end portions extend from the intermediate portions to the suspension arm or wheel hubs.

While the present design for bracket assemblies have performed well in the field, the design of the elastomeric bushing requires the bushing to be assembled onto the stabilizer bar from one of the ends of the stabilizer bar. This requirement makes it necessary to assemble the elastomeric bushing prior to attaching the ends to the suspension system and it also requires the detachment of the end of the stabilizer bar from the suspension system when replacement or service of a bushing is required.

The continued development of the stabilizer bar bracket assemblies has included the development of elastomeric bushings and brackets which simplify the system and the attachment of the system to the vehicle with compromising the performance of the bushing and in some applications increasing the performance of the bushings.

SUMMARY OF THE INVENTION

The present invention provides the art with an elastomeric bushing which is designed as a hinged or split cylindrical member which enables the installation of the bushing directly at the point of attachment eliminating the need to slide the bushing along the stabilizer bar. Also, because the elastomeric bushing is positioned directly at the point of attachment of the stabilizer bar, rigid shells which function as rate plates can be imbedded within the elastomeric material. This would not be possible in some prior art cylindrical bushing designs because the elastomeric bushing when being assembled from one end is required to go around bends in the stabilizer bar and the inclusion of a rigid shell may prohibit this movement around the corner. The present invention eliminates the need to move along the stabilizer bar thus permitting the inclusion of rigid shells regardless of the shape of the stabilizer bar.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic view of a stabilizer bar assembly incorporating the unique bushing assembly in accordance with the present invention;

FIG. 2 is an enlarged view of the bushing assembly in accordance with the present invention;

FIG. 3 is an end view of the bushing assembly shown in FIG. 2;

FIG. 4 is an end view of the elastomeric bushing illustrated in FIG. 3;

FIG. 5 is a cross-sectional view taken in the direction of arrows 5—5 in FIG. 4;

FIG. 6 is a cross-sectional view taken in the direction of arrows 6—6 in FIG. 5; and FIG. 7 is a perspective view of the bracket illustrated in FIG. 3.

DETAILED DESCRIPTION OF THE PREFERRED EMBODIMENT

The following description of the preferred embodiment(s) is merely exemplary in nature and is in no way intended to limit the invention, its application, or uses.

Referring now to the drawings in which like reference numerals designate like or corresponding parts throughout the several views, there is shown in FIG. 1 a stabilizer bar assembly which is identified generally by the reference numeral 10. Stabilizer bar assembly 10 comprises a pair of stabilizer bars 12 each having a pair of bushing assemblies 14. (Only one shown in FIG. 1.) Each stabilizer bar 12 is a multi-piece generally U-shaped bar having a center section 16 and a pair of end section 18. (Only one shown in FIG. 1.) Center section 16 is a straight bar designed to be secured to the sprung mass of the vehicle by a respective pair of bushing assemblies 14. End section 18 are separate components which are designed to be secured to center section 16 and to the left and right suspension arms or hub assemblies 20 of the vehicle to which stabilizer bar assembly 10 is designed for. The unique configuration for stabilizer bar 12 permit stabilizer bar assembly 10 to function in the particular vehicle to which it is assembled without interfering with the components of the vehicle which are positioned within the general area of stabilizer bar assembly 10. FIG. 1 illustrates a truck suspension system which incorporates a pair of stabilizer bars 12 each attached to a separate hub assembly 20.

Referring now to FIGS. 2–7, each bushing assembly 14 comprises an elastomeric bushing 40 and a fastening strap 42. As shown in FIGS. 4–6, elastomeric bushing 40 comprises a first semi-circular member 44 and a second semi-circular member 46 held together by a single longitudinally extending hinge 48. An inside diameter 50 formed by semi-circular members 44 and 46 is designed to be smaller than the bar diameter for center section 16 of stabilizer bar 12. An outside diameter 52 is designed to be larger than an inside diameter 54 of fastening strap 42. This dimensioning provides a specified amount of compression for elastomeric bushing 40 upon assembly within the vehicle. The compression of elastomeric bushing 40 provides mechanical friction between elastomeric bushing 40 and stabilizer bar 12 and between elastomeric bushing 40 and fastening strap 42. This mechanical friction allows for tensional wind-up and deflection of elastomeric bushing 40 to prevent any slipping between the mating components.

Hinge 48 is a continuous web which interconnects the inside layer of elastomeric material of elastomeric bushing 40 at opposite sides of the split. Hinge 48 is not only a connecting web, it is also a multi-functioning segment of elastomeric bushing 40. Hinge 48 does serve as an interconnecting member between semi-circular members 44 and 46 and it initially functions as a hinge to simplify the assembly process as described below. Once assembled, hinge 48 transforms into a load carrying member which becomes radially compressed after installation to function as a load carrying structural member of elastomeric bushing 40.

In the preferred embodiment, the percent compression for elastomeric bushing 40 after it is assembled over stabilizer bar 12, into a frame bracket 56, which is attached to the sprung mass of the vehicle, and within fastening strap 42 is between 17% and 29% compression and more preferably, it is between 20% and 25%. When the percent of compression for elastomeric bushing 40 is less than approximately 17%, slippage of elastomeric bushing 40 can occur. When the percent of compression for elastomeric bushing 40 exceeds approximately 29%, the assembly of elastomeric bushing 40 and stabilizer bar 12 with fastening strap 42 becomes difficult and/or impractical.

Integrally molded and bonded within the first semi-circular member 44 is a first rate plate 60 and integrally molded and bonded within the second semi-circular member 46 is a second rate plate 62. Rate plates 60 and 62 are rigid components manufactured from metal or plastic. Rate plates 60 and 62 are designed to support radial, axial conical dynamic loads and accept oscillatory displacement during typical conditions prevailing in automotive applications, including heavy duty truck suspension applications. The oscillator motion is induced by the tire/suspension's vertical displacement which causes the tensional wind-up of the inside and outside rubber layers of elastomeric bushing 40 which are bonded to rate plates 60 and 62. In order to assure a balanced stress distribution in the inside and outside layers of elastomeric bushing 40, rate plates 60 and 62 are each designed to be less than 180° and thus their total angular extension is less than 360°. This creates a symmetrical gap 64 and 66 between the edges of rate plates 60 and 62 on opposite sides of elastomeric bushing 40. Although the edges of rate plates 60 and 62 are covered with the elastomeric material, gap 66 on the hinged side is maintained between the top and bottom of the outside rubber layer. In addition, to assure that rate plates 60 and 62 are free floating and for an internal stress balancing function, rate plates 60 and 62 are clearance fit into fastening strap 42 in the axial direction.

Rate plates 60 and 62 extend beyond both ends of the elastomeric material for semi-circular members 44 and 46 to create extensions 68 and 70. Extensions 68 and 70 on each semi-circular member 44 and 46 provide for axial bushing displacement control by acting as a stop against fastening strap 42 under severe dynamic conditions. Extensions 68 and 70 also function as load supporting elements and they enhance the displaced rubber confinement factor.

As an additional spring rate and tensional oscillation angle tuning feature, the elastomeric material for semi-circular members 44 and/or 46 can incorporate circumferential voids or grooves 74 or axial voids or grooves 76, as shown in FIGS. 4–6. These voids or grooves will result in a higher oscillation angle capability without slippage and still maintain the necessary radial rate stiffness which is a requirement in stabilizer bar applications.

Fastening strap 42 generally c-shaped member having a C-shaped body 80, a pair of flanges 82 and a pair of side walls 84. C-shaped body defines inside diameter 54 and it is sized to mate with elastomeric bushing 40 to provide the specified percent compression of elastomeric bushing once fastening strap 42 is attached to the vehicle. Each flange 82 extends outwardly from C-shaped body 80 and it defines a slotted hole 86 which is utilized to secure stabilizer bar assembly 10 to frame bracket 56 and thus to the sprung mass of the vehicle. The slotting of holes 86 compensates for the various tolerance stack-ups which occur in the vehicle itself as well as the tolerances in stabilizer bar assembly 10. Side walls 84 extend towards flanges 82 on opposite sides of C-shaped body to enclose the portion of fastening strap 42 which mates with elastomeric bushing 40. Side walls 84 act to contain elastomeric bushing 40 within fastening strap 42 during the compression of elastomeric bushing 40 as well as a stop for extensions 68 and 70 of rate plates 60 and 62 when severe dynamic conditions are experienced.

The attachment of stabilizer bar assembly 10 to the vehicle requires that center section 16 be attached to the sprung mass of the vehicle and that end portions 18 be assembled to a respective control arm, hub assembly or other component of the unsprung mass of the vehicle. Because of the hinged construction of elastomeric bushing 40, there is not a required order for the assembly of stabilizer bar assembly 10.

The attachment of center section 16 begins with the attachment of one or more (typically two) elastomeric bushings to center section 16 of stabilizer bar 12. Elastomeric bushing 40 is split axially along one side of semi-circular members 44 and 46. The opposite sides of semi-circular members 44 and 46 are connected by hinge 48 which is the inside layer of structural elastomeric material wall. Consequently, by pulling semi-circular members 44 and 46 apart at the split side like a clam shell, elastomeric bushing 40 can be opened by the flexing of hinge 48. This hinging capability facilitates a simple, quick and precise positioning of elastomeric bushing 40 at any location on center section 16 of stabilizer bar 12. The actual securing of elastomeric bushing 40 to center section 16 of stabilizer bar 12 will be accomplished by the compression of elastomeric bushing 40 as described below.

Once elastomeric bushings 40 are positioned on center section 16 of stabilizer bar 12, stabilizer bar 12 is moved into position on the vehicle and elastomeric bushings 40 engage frame brackets 56. A respective fastening strap 42 is assembled over each elastomeric bushing 40 and a pair of bolts 88 are assembled through slotted holes 86 and into nuts 90 or into threaded connections provided on frame brackets 56 and/or on the sprung portion of the vehicle. Bolts 88 and/or nuts 90 are then tightened to complete the attachment.

Inside diameter 50 and outside diameter 52 of elastomeric bushing 40 are designed to provide an interference fit when installed over center section 16 of stabilizer bar 12 and into frame bracket 56 and fastening strap 42. Thus, radial compression of both portions of the elastomeric material layers above and below rate plates 60 and 62 occurs which forces both layers to displace in both an axial and circumferential direction. If necessary to minimize the internal stress concentration effect caused by the compression of the walls, elastomeric bushing 40 in its free state (as molded) can incorporate voids or grooves 74 and/or 76. For the compressed rubber displacement, longitudinal gaps 64 and 66 as molded between rate plates 60 and 62 provide space for circumferential rubber displacement and an angle 92 at the end of the elastomeric material adjacent extensions 68 and 70 provide space for axial rubber displacement. Preferably, this angle at the end of the elastomeric material is forty-five degrees.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A stabilizer bar assembly comprising:
   a stabilizer bar;
   a first bushing assembly attached to said stabilizer bar, said first bushing assembly comprising:
      a first frame bracket disposed around said stabilizer bar, said first bracket being adapted for attachment to a vehicle;
      a first elastomeric bushing disposed between said first frame bracket and said stabilizer, said first elastomeric bushing having a first semi-circular member, a second semi-circular member and a first hinge connecting said first and second semi-circular members;
      a first semi-circular rate plate disposed within said first semi-circular member; and
      a second semi-circular rate plate disposed within said second semi-circular member; wherein:
         said first elastomeric bushing is compressed to a first specified percent compression by said first frame bracket; and
         said first and second semi-circular members define a first gap for accommodating the movement of said first elastomeric bushing during compression of said first elastomeric bushing.

2. The assembly according to claim 1 wherein said first gap comprises a first longitudinal gap extending between said first and second semi-circular members.

3. The assembly according to claim 2 wherein said first gap comprises a second longitudinal gap extending between said first and second semi-circular members adjacent said hinge.

4. The assembly according to claim 1 wherein said first gap comprises a second longitudinal gap extending between said first and second semi-circular members adjacent said hinge.

5. The assembly according to claim 1 wherein said first gap comprises one or more circumferential grooves formed in said elastomeric bushing.

6. The assembly according to claim 5 wherein said first gap comprises one or more longitudinally extending grooves formed in said elastomeric bushing.

7. The assembly according to claim 1 wherein said first gap comprises one or more longitudinally extending grooves formed in said elastomeric bushing.

8. The assembly according to claim 1 wherein said first semi-circular rate plate includes a first extension protruding from said first semi-circular member and said second semi-circular rate plate includes a second extension protruding from said second semi-circular member.

9. The assembly according to claim 1 wherein said first frame bracket comprises a generally c-shaped body and a pair of side walls extending from opposite sides of said c-shaped body, said first elastomeric bushing being disposed between said pair of side walls of said first frame bracket.

10. The assembly according to claim 9 wherein said first and second rate plates are disposed between said pair of side walls of said first frame bracket.

11. The assembly according to claim 8 wherein said first frame bracket comprises a generally c-shaped body and a pair of side walls extending from opposite sides of said c-shaped body, said first elastomeric bushing being disposed between said pair of side walls of said first frame bracket.

12. The assembly according to claim 11 wherein said first and second rate plates are disposed between said pair of side walls of said first frame bracket.

13. The assembly according to claim 1 further comprising:
   a second bushing assembly attached to said stabilizer bar, said second bushing assembly comprising:
      a second frame bracket disposed around said stabilizer bar, said second bracket being adapted for attachment to the vehicle;
      a second elastomeric bushing disposed between said second frame bracket and said stabilizer, said second elastomeric bushing having a third semi-circular member, a fourth semi-circular member and a second hinge connecting said third and fourth semi-circular members;
      a third semi-circular rate plate disposed within said third semi-circular member; and
      a fourth semi-circular rate plate disposed within said fourth semi-circular member; wherein:
         said second elastomeric bushing is compressed to a second specified percent compression by said second frame bracket; and said third and fourth semi-circular members define a second gap for accommodating the movement of said second elastomeric bushing during compression of said second elastomeric bushing.

14. The assembly according to claim 13 wherein said second frame bracket comprises a generally c-shaped body and a pair of side walls extending from opposite sides of said c-shaped body, said first elastomeric bushing being disposed between said pair of side walls of said second frame bracket.

15. The assembly according to claim 14 wherein said third and fourth rate plates are disposed between said pair of side walls of said second frame bracket.

* * * * *